(12) United States Patent
Terakita

(10) Patent No.: US 6,209,035 B1
(45) Date of Patent: Mar. 27, 2001

(54) SYSTEM AND METHOD FOR ESTABLISHING COMMUNICATION LINKS AND TRANSFERRING DATA AMONG A PLURALITY OF COMMICATION NODES

(75) Inventor: Katsuji Terakita, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,355

(22) Filed: Jun. 30, 1998

(30) Foreign Application Priority Data

Jun. 30, 1997 (JP) .................................................. 9-173350

(51) Int. Cl.[7] ...................................................... G06F 15/16
(52) U.S. Cl. .......................... 709/227; 370/378; 709/218; 709/235
(58) Field of Search ................................... 370/378, 397; 709/218, 227, 235

(56) References Cited

U.S. PATENT DOCUMENTS 5,365,519 * 11/1994 Kozaki et al. ...................... 370/378
5,506,840 * 4/1996 Pauwels et al. .................... 370/397
5,574,938 * 11/1996 Bartow et al. ...................... 709/235
5,790,793 * 8/1998 Higley ................................. 709/218

* cited by examiner

Primary Examiner—Ahmad F. Matar
Assistant Examiner—Tammy Tak-Kam Lee
(74) Attorney, Agent, or Firm—Douglas W. Cameron; Anne Vachon Dougherty

(57) ABSTRACT

Data is transferred by establishing a communication link without deciding in advance the primary and the secondary nodes in a distributed processing system which uses a connection oriented API. When an application program (AP) issues a connection request signal, a communication link A1 is brought to a condition in which it can be established (S100) and a communication link A2 is brought to a condition in which it can be accepted (S102). It is determined whether or not the communication link has been established (S104). If the link A2 is established, the communication link A2 is registered as a communication link A (S106) while it is requested to establish the communication link A1 otherwise (S108). It is determined whether or not the communication link A1 has been established (S10) and, if it is established, it is registered as a communication link A. Otherwise, it waits for a predetermined time period then repeats establishment of the communication Link A1 or A2 and transfers data on whichever link is established earlier.

5 Claims, 4 Drawing Sheets

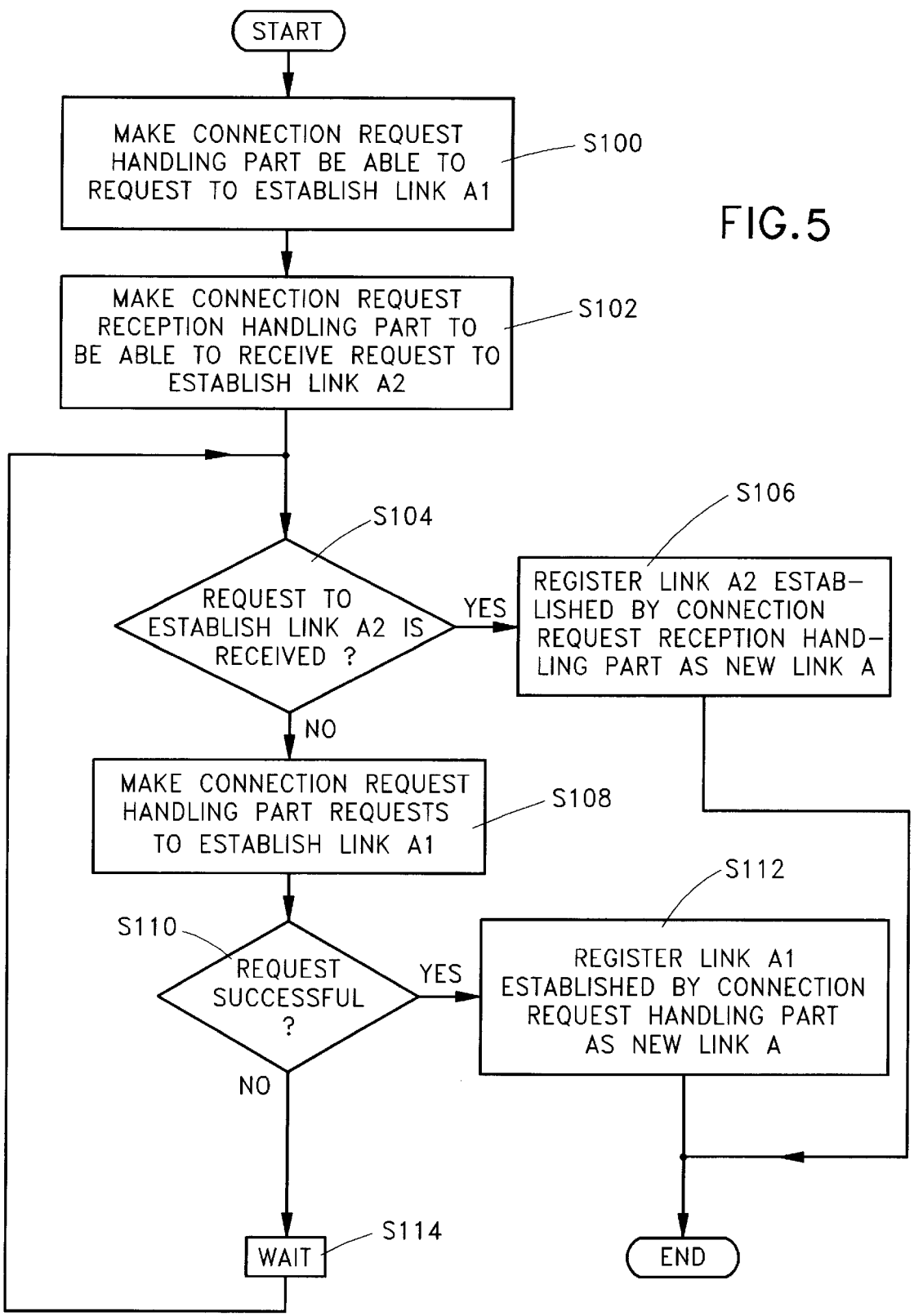

SYSTEM AND METHOD FOR ESTABLISHING COMMUNICATION LINKS AND TRANSFERRING DATA AMONG A PLURALITY OF COMMICATION NODES

FIELD OF THE INVENTION

This invention relates to a data transfer system for transferring data among communication nodes, such as computers, through a communication network or a client server system, and a method therefor.

BACKGROUND OF THE INVENTION

A distributed processing system has been used for connecting a plurality of communication nodes, such as computers, through a communication network or a client server system (hereinafter simply called a "communication network") to transfer data which is required for processing an application program among communication nodes.

An application program running at each of the communication nodes of such distributed processing system transfers data between itself and other communication nodes by using an interface called application programming interface (API). Included in such API are a connectionless API for transferring data between communication networks through a connectionless communication and a connection oriented API for transferring data through a connection oriented communication.

When the connection oriented API is used as such an API, one of two communication nodes communicating with each other requests the network to connect to the other of the communication nodes. The other communication node is able to transfer data after the communication network has established a communication link between the two communication nodes in response to the request. When the connection oriented API is used in the prior art, it had to be decided which of the two communication nodes transferring data is the primary node, which requests the communication network for the connection, and which is the secondary node, which waits for a connection request from the communication counterpart in order for an application program in a communication node to start the connection oriented API.

As such, when the connection oriented API was used in the prior art, the content of an application program had to be modified or the system had to be designed with a distinction between the primary and the secondary nodes in mind depending on whether the application program is operating in the primary node or the secondary node, so that the processing and configuration of the distributed processing system was accordingly restricted.

It is not required to distinguish the communication nodes between the primary and the secondary nodes in the manner as described in the above when the connectionless API is used. However, the connectionless API cannot always be executable in a communication node.

As an example, PUPA6-75885 discloses a communication scheme in a distributed processing system in which a disconnected communication link of a connection oriented communication is reconnected. As another example of a communication scheme in a distributed processing system, PUPA8-331267 discloses a communication scheme in a communication system using a connectionless or a connection oriented communication between a monitoring apparatus and a monitored apparatus. As a further example of a communication scheme in a distributed processing system, Japanese patent 2513933 discloses a communication scheme in a distributed processing system in which a transfer path is selected when a broadcast communication message is sent out by a connectionless communication.

However, none of the communication schemes disclosed in the above patent and patent applications resolve the problem of the requirement of deciding in advance which of the communication nodes is the primary and which is the secondary node when data is to be transferred among a plurality of communication nodes through a connection oriented communication.

In view of the problems of prior art as described in the above, it is an object of the invention to provide a data transfer system and method which enables a communication link to be established for data transfer among a plurality of communication nodes through a communication link established by a connection oriented communication without deciding in advance which of the plurality of communication nodes is the primary and the secondary node.

It is another object of this invention to provide a data transfer system and method which enables an application program to run in each communication node without deciding in advance which of the communication nodes is the primary or the secondary node, thereby improving the freedom of the content of the application program.

It is a further object of this invention to provide a data transfer system and method which allows a system to be designed without deciding in advance which of the communication nodes is the primary or the secondary node, thereby improving the flexibility in configuring a distributed processing system.

SUMMARY OF THE INVENTION

To achieve the above objectives, the data transfer system of this invention comprises; a plurality of communication nodes and communication means for establishing a communication link with another communication node through a communication port in response to respective requests by said plurality of communication nodes to transfer data through the established communication link. Each of the plurality of communication nodes of the invention comprises: a first means for requesting to establish a communication link, which requests said communication means to establish a first communication link through a first communication port for use by the communication counterpart (remote node) to accept an establishment of the communication link; a second means for accepting a second communication link, for accepting an establishment of a second link through a second communication port by said communication means in response to a request by said remote node; and, a data transfer means for transferring data to and from said remote node through said first or second communication link; wherein said communication nodes, in mutually transferring data, respectively repeat establishment of said first communication link to said remote node, while awaiting establishment of said second communication link from said remote node, and transfer data through either one of said first and second communication links whichever is established earlier.

BRIEF DESCRIPTION OF THE DRAWINGS

The invention will now be described in greater detail with specific reference to the figures wherein:

FIG. 5 is a diagram which shows the operation of the communication link establishment handling part, the connection request handling part, and the connection request reception handling part shown in FIG. 2;

DETAILED DESCRIPTION OF THE PREFERRED EMBODIMENT

Figure 1:
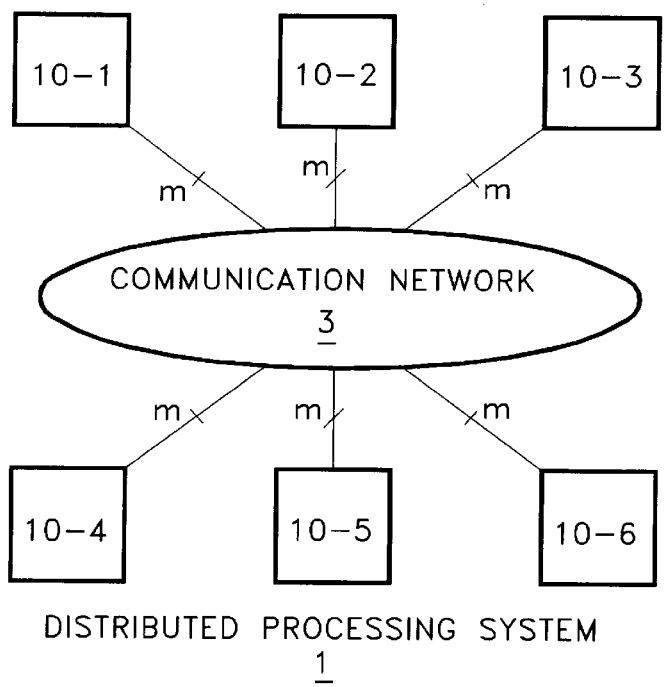
FIG. 1 is a view showing an example of a distributed processing system to which the data transfer method of this invention is applied.

In the data transferring system of this invention, a plurality of communication nodes, such as computers, are connected through a communication network or a server system which has a connection oriented API for transferring data by a connection oriented communication, thereby allowing application software running in respective communication nodes to activate a communication control part to provide a communication control in a communication node to communicate without deciding in advance which of the communication nodes is a primary or a secondary node.

The communication control part in the respective communication nodes is capable of establishing a communication link through a plurality of communication ports in the communication network. In the communication control part, a first communication link establishing means, responsive to the activation of the communication control part by the application program, requests that the communication network establish a first communication link to a communication counterpart node (i.e., remote node) through any of a plurality of available communication port (hereinafter, a "first communication port"). The first communication link establishing means, in failing to establish a first communication link (i.e., when a communication link cannot be established despite the request to establish a first communication link, due to a congestion of the communication network or a conflict of link establishment), repeats a request to establish a first communication link after a predetermined length of time (e.g., a time that is set to a random length within a predetermined range) has elapsed.

The second communication link accepting means awaits establishment of a communication link (i.e., the "second communication link") through one of the available communication ports from the remote node (i.e., the "second communication port"), the class of available ports not including the first communication port.

By requesting to establish a communication link to the remote node by said first communication link establishing means and continuing to wait for a communication node to be established from the remote node by the second means for accepting communication link, either a communication link which the first communication link establishing means of its own requested to establish or one which the second communication link accepting means of the remote node accepted, or a communication link which the first communication link establishing means of the remote node requested to establish and the second communication link accepting means of its own accepted, is eventually established and the communication control part of the communication node becomes ready for transferring data through either one of such links.

Thus, by repeating a request to establish a communication link by the first communication link establishing means and accepting establishment of a communication link by the second communication link accepting means, it is not necessary to decide in advance which of the nodes is to be the primary and which is to be the secondary node, so that the communication control part of the communication node can transfer data through either the first communication link or the second communication link, whichever is established earlier.

First, the configuration of the distributed processing system is described. FIG. 1 is a view showing a configuration of a distributed processing system 1 to which the data transfer method of this invention is applied. As shown in FIG. 1, the distributed processing system 1 comprises n (FIG. 1 shows the case where n=6) communication nodes 10-1, . . . , 10-n which are connected by a communication network 3.

Components of Distributed Processing System

The communication network 3, including a data communication network, an ISDN communication network, a local area network (LAN), a telephone network, or a wireless communication system using an electric wave signal or an infrared signal, establishes a communication link in response to a connection request from a communication node 10. A communication node 10 is hereinafter meant to include any of communication nodes 10-1, . . . ,10-n unless specifically designated. The communication network transfers data between the communication node 10 which issued a connection request and a communication node which is a communication counterpart to the communication node 10 through a connection oriented communication.

A communication node 10-i(i=1, . . . ,n) is a data processing device, such as a personal computer, a workstation, a general purpose computer or a database system, which is assigned a unique address in the distributed processing system and is connected to the communication network 3 through m(m>1) communication ports(channels) A1, . . . , Am (including a virtual communication port).

The communication node 10-i requests the communication network to establish one or more communication link A1 using one or more of m communication ports A1, . . . , Am (similarly including a virtual communication port) or accepts from the communication network an establishment of one or more communication link A2 using one or more communication ports of the m communication ports to transfer data to and from a counterpart communication node 10-j(j=1, . . . ,n) through either one of the established communication links (A1 or A2). In other words, the communication node 10 is capable of establishing one or more communication links (i.e., multiple links) on the communication network 3 between itself and another counterpart communication node 10 to transfer data through one or more of the multiple links. The hardware of the communication node 10 is not described here because it is known in the art as described in the above.

For simplicity of description, it is assumed in the description of an embodiment that the number m of the communication ports of the communication node 10 is 2, while the number of communication links which a communication node 10 requests the communication network to establish, as well as the number of communication links of which a communication node 10 accepts established communication link from the communication network 3, are 1 each.

Figure 2:
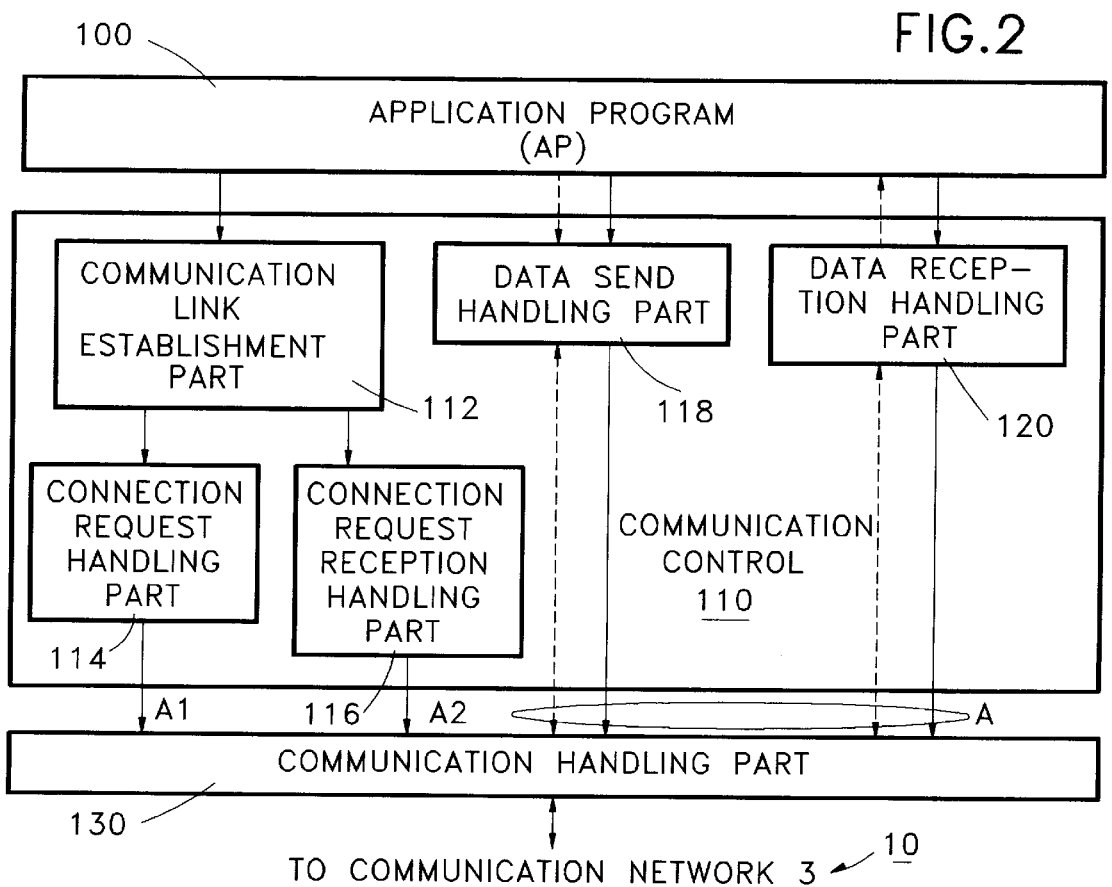
FIG. 2 is a view showing a software configuration of the communication node shown in FIG. 1.

With reference to FIG. 2, a software of the communication node 10 is now described. FIG. 2 is a diagram which shows a software configuration of the communication nodes 10(10-1, . . . ,10-n) shown in FIG. 1. As shown in FIG. 2, the communication node 10 comprises an application program (AP) 100, a communication control part 110 and a communication handling part 130.

The communication control part 110 comprises a communication link establishment handling part 112, a connection request handling part 114, a connection request reception handling part 116, a data send handling part 118 and a data reception handling part 120.

An arbitrary communication node 10, to be described below, is designated a local communication node 10 as distinguished from a counterpart communication node 10 which is designated a remote communication node 10.

The application program 100 on the local communication node is a conventional distributed processing software for transferring and processing data between itself and an application program 100 running on the remote communication node 10, such as for collecting remote system information, controlling a remote workstation and controlling a network telephone. The application program 100 in the local communication node 10 requests the communication link establishment handling part 112 of the communication control part 110 to establish in advance a communication link in preparation for user data transfer between itself and the application program 100 in the remote communication node 10.

When a communication link A is established for the remote communication node 10 by the communication link establishment handling part 112, the application program 100 requests the data send handling part 118 of the communication control part 110 to send data, or requests the data reception handling part 120 of the communication control part 110 to receive data, and sends data (including the address of the remote communication node 10, address of the local communication node 10, and user data) to or receives data from (transfers data to or from) the application program 100 in the other communication node 10.

When all data have been transferred, the application program 100 requests the communication link establishment handling part 112 to release establishment of the communication link and completes the data transfer.

In the communication control part 110, the communication link establishment handling part 112 is responsive to a communication link establishment request by the application program to output a connection request to the connection request handling part 114 in a predetermined time interval for having the communication network 3 establish a communication link A1 from the communication port A1' of the local communication node 10 to the communication port A2' of the remote communication node 10.

By making the time interval, from the failure to establish the communication link A1 to the next request to establish the communication link A1, random within a given range, a situation where conflicts of link establishment occur successively between the local communication node 10 and another communication node 10 is preferably avoided. When the communication link A1 is not normally established due to congestion of the communication network or a conflict of establishment of communication link, the communication link establishment handling part 112 will have the connection request reception handling part 116 issue a connection reception to accept establishment of a communication link A2 from the communication port A1' of the remote communication node 10 to the communication port A2' of the remote communication node 10.

Figure 3:
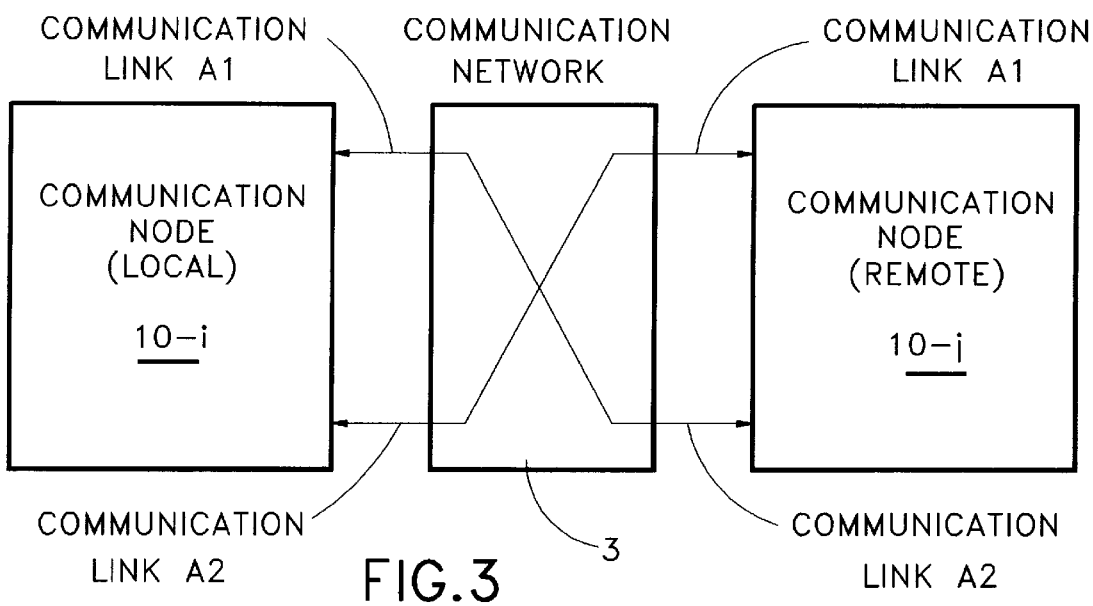
FIG. 3 is a diagram which shows the relationship of connection between the communication nodes shown in FIG. 1.

A relationship of the connection between a local communication node 10-i and a remote communication node 10-j is now described. FIG. 3 is a diagram which shows the relationship of connection between the communication nodes (10-i, 10-j) shown in FIG. 1. As shown in FIG. 3, the communication link A1 as seen from the local communication node 10-i is the communication link A2 as seen by the remote communication node 10-j while the communication link A2 as seen by the local node 10-i is the communication link A1 as seen by the remote communication node 10-j. In other words, the communication link establishment handling part 112 of the local communication node 10-i requests the communication network 3 to establish the communication link A1 from the communication port A1 of the communication node 10-i to the communication port A2 of the remote communication node 10-j and so controls the connection request handling part 114 and the connection request reception handling part 116 so that the communication network 3 accepts an establishment of the communication link A2 from the communication port A1 of the communication node 10-j to the communication port A2 of the communication node 10-i in response to the request from the communication node 10-j to register either the communication link A1 or the communication link A2 as a communication link A, depending upon which is established earlier.

The connection request handling part 114 (FIG. 2) controls the communication handling part 130, under the control of the communication link establishment handling part 112, generates a request to the communication network 3 to establish the communication link A1. The connection request handling part establishes a communication link when the request for establishment is successfully completed.

The connection request reception part 116 controls the communication handling part 130 under the control of the communication link establishment handling part 112 to have it accept the request for establishment of the communication link A2 by the communication network 3. The connection request reception part establishes the communication link A2 if establishment is requested.

Figure 4:
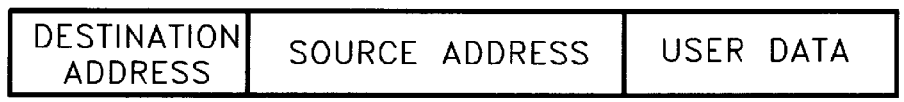
FIG. 4 is a view showing an example of the format of a transferred data which is transferred by the communication node on the communication network.

FIG. 4 is a diagram showing a format of data which the communication node 10 transfers on the communication network 3.

The data send handling part 118 receives an address of the destination remote communication node 10 and user data from the application program 100 to assemble the transfer data shown in FIG. 4 by adding the address of the local source node 10 to the received data. The data send handling part controls the communication handling part 130 to have it send the assembled transfer data to the remote communication node 10 through the communication link A.

The data reception handling part 120 controls the communication handling part 130, to have it receive the data transferred through the communication link A, and accepts the data received by the communication handling part 130 to output the data contained in the accepted data (i.e., the user data and a source address, etc.) to the application program 100.

The communication handling part 130 controls a connection-oriented data transfer among the connection request handling part 114, the application program 100 and the communication network 3. For example, it is implemented in accordance with a transmission control protocol (TCP). Specifically, the communication handling part 130 does the following: requests the communication network 3 to establish the communication link A1 in response to a connection request from the connection request handling part 114; accepts an establishment of the communication link A2 from the communication network 3 in response to the connection request from the connection request reception handling part 116; sends the transfer data coming from the data send handling part 118 (FIG. 4) to the remote communication node 10 through the communication link A; receives the transfer data from the remote communication node 10 through the communication link A; and, outputs it to the data reception handling part 120.

Figure 6:
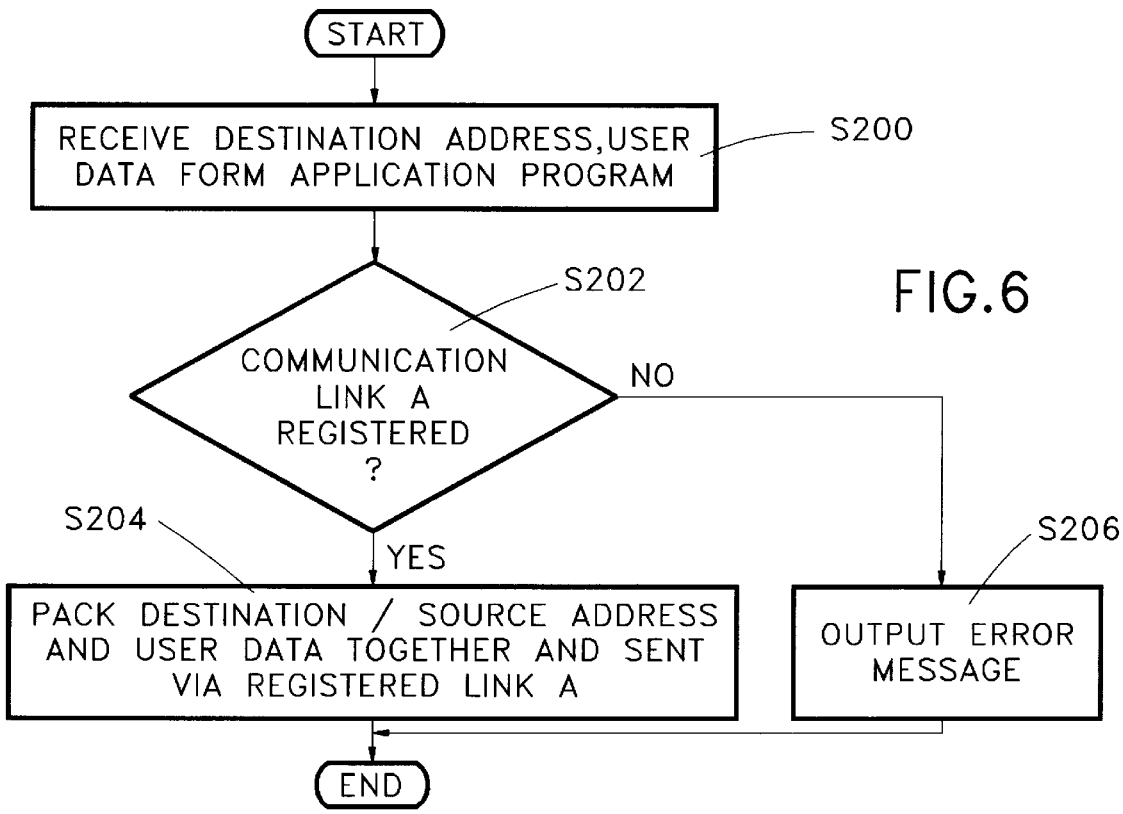
FIG. 6 is a flow chart showing the process in which the data send handling part shown in FIG. 2 sends data in response to the control by an application program.
Figure 7:
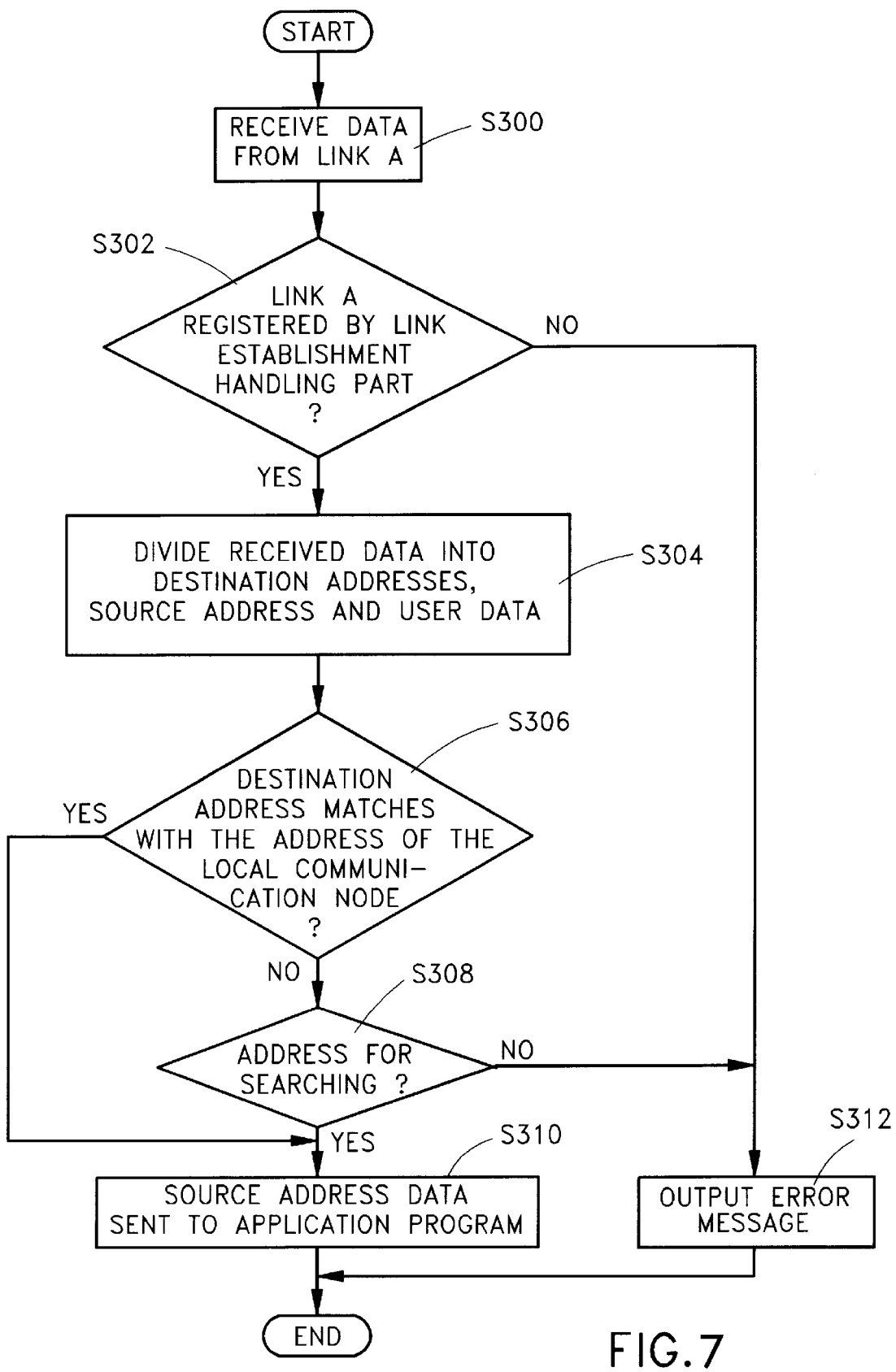
FIG. 7 is a flow chart showing the process in which the data reception handling part shown in FIG. 2 receives data in response to the control by an application program.

The operation of the distributed processing system 1 will now be described with reference to FIG. 5 to 7. FIG. 5 is a diagram showing the operation of the communication link establishment handling part 112, the connection request handling part 114, and the connection request reception handling part 116 of the communication node 10. When the application program 100 in the local communication node 10-i performs a predetermined processing, the communication link establishment handling part 112 of the communication handling part 110 requests establishment of a communication link in preparation for data transfer to the application program 100 in the remote communication node 10-j.

As shown in FIG. 5, the communication link establishment handling part 112 outputs a connection request to the connection request handling part 114 to place it in a condition in which the communication link A1 can be established through the communication port A1, at step 100 (S100). At step 102, the communication link establishment handling part 112 outputs a connection acceptance to the connection request reception handling part 116 to place it in a condition in which establishment of the communication link A2 through the communication port A2 can be accepted. At step 104, the communication link establishment handling part 112 determines whether or not the connection request handling part 116 has received a request for establishing the communication link A2 from the communication network 3 which responded to the request from the communication node 10-j prior to this time point and the communication link A2 has been established between the communication port A2 of the local communication node 10-i and the communication port A1 of the remote communication node 10-i on the communication network 3. The communication link establishment handling part 112 proceeds to step S106 when the connection request reception handling part 116 has received a request for establishing the communication link A2 and the communication link A2 has been established, whereas it proceeds to step S108 when the connection request reception handling part 116 has not established the communication link A2.

At step 106 (S106), the communication link establishment handling part 112 registers the communication link A2 which is established by the connection request reception handling part 116 as a communication link A. At step 108(S108), the communication link establishment handling part 112 controls the connection request handling part 114 based on the destination address inputted by the application program 100 to have it request the communication network 3 to establish the communication link A1. At step 110(S110), the communication link establishment handling part 112 determines whether or not the request for establishing the communication link A1 by the connection request handling part 114 is successful and whether the communication link A1 has been established between the communication port A1 of the local communication node 10-i and the communication port A2 of the remote communication node 10-j. It proceeds to S112 when the communication link A1 has been established, while it proceeds to S114 when the link has not been established.

At step 112 (S112), communication link establishment handling part 112 registers the link A1 which is established by the connection request handling part 114 as a communication link A. At step 114 (S114), communication link establishment handling part 112 stands by for a predetermined length of time.

Described below is the operation of the distributed processing system 1 when the local communication node 10-i sends data to the remote communication node 10-j. FIG. 6 is a flow chart showing the process in which the data send handling part 118 sends data in response to the control by the application program 100. At step 200 (S200), the data send handling part 118 of the local communication node 10-i receives user data and a destination address from the application program 100. At step 202 (S202), the data send handling part 118 determines whether or not the communication link establishment handling part 112 has registered the communication link A and proceeds to S204 when the communication link A has been registered, while it proceeds to S206 when it is not registered.

At step 204 (S204), the data send handling part 118 prepares transfer data by packaging a source address, a destination address and user data together (FIG. 4) and sends it to the remote communication node 10-i through the communication handling part 130 via the registered communication link A on the communication network 3. At step 206 (S206), data send handling part 118 outputs an error message to the application program 100.

Described below is the operation of the distributed processing system 1 where the local node 10-i receives data from the remote communication node 10-j. FIG. 7 is a flow chart showing a process in which the data reception handling part 120 receives data in response to the control by the application program 100. At step 300 (S300), the data reception handling part 120 at the local communication node 10-i receives a transfer data from the communication link A on the communication network 3 through the communication handling part 130. At step 302 (S302), the data reception handling part 120 determines whether or not the communication link establishment handling part 112 has registered the communication link A and proceeds to S304 when the communication link A has been registered, while it proceeds to S312 when the link is not registered.

At step 304 (S304), the data reception handling part 120 divides the data contained in the received transfer data into a source address, a destination address and user data (FIG. 4). At step 306 (S306), the data reception handling part 120 determines whether or not the destination address in the process at S304 matches the address of the local communication node 10-i. The data reception handling part proceeds to S310 when the match is obtained, while it proceeds to S308 when the match is not obtained.

At step 308 (S308), the data reception handling part 120 determines whether or not the destination address in the process at S304 is the address for searching the communication node 10 in the distributed processing system. It proceeds to S310 when the destination address is the address for searching the communication node 10 in the distributed processing system, while it proceeds to S312 otherwise.

At step 310 (S310), the communication network 310 delivers the source address and the user data in the process at S304 to the application program 100. At step 312 (S312), the communication network 312 outputs an error message to the application program 100.

As described in the above, in the distributed processing system 1 to which the data transfer method of this invention is applied, the data can be transferred between communication nodes without deciding in advance which of the communication nodes is to be the primary or the secondary node, even when the communication network 3 transfers data only through a connection oriented communication with data transfer through a connectionless communication not being supported.

Although the above described embodiment gave an example where the communication handling part 130 gave a communication control with TCP, the configuration of the distributed processing system 1 may be so modified that the communication control part 110 gives a communication control according to other protocol. Particularly, the data transfer method of this invention is efficient when the communication network 3 is one which transfers data according to a connection oriented infrared communication (IrDA).

Though the communication nodes 10 were connected to each other through the communication network 3 in the above embodiment, the distributed processing system 1 may be configured using other devices such as a client-server configuration instead of the communication network, for example. Also, after the communication link establishment handling part 112 controls the connection request handling part 114 to interrupt reception of a request for establishing the communication link A2 in the process at S108 (FIG. 5), the connection request reception handling part 116 may then be so controlled as to accept the request for establishing the communication link again.

Though the operation in the side of the local communication node 10 was mainly described in the above embodiment, the operation of the local communication node 10 and the operation of the remote communication node 10 are symmetrical and identical. Therefore, the operation in the side of the remote communication node 10 should be understandable by replacing the local communication node 10 with the remote communication node 10 in the above description. Also, each of the components given as a software in the communication node 10 in the above embodiment may be replaced with any other means, e.g., a hardware like means, so long as the same function and performance can be embodied.

Beside the above described embodiment, various kind of modifications may be possible to the distributed processing system 1 of this invention as indicated by these examples of modification. As described in the above, the data transfer system and data transfer method of this invention allow data to be transferred by establishing a communication link without deciding in advance which of a plurality of communication nodes which mutually transfer data through a communication link established in a connection oriented communication is to be the primary or the secondary node. Further, the freedom of processing by an application program is improved because the data transfer system and data transfer method of this invention allow an application program to run in each communication node without deciding in advance which of the communication nodes is to be the primary or the secondary node. Further, the flexibility of the configuration of the distributed processing system is improved because the system can be designed without deciding in advance which of the communication nodes is to be the primary or the secondary node.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by letters patent is:

1. A data transfer system comprising:
   a plurality of communication nodes having a plurality of communication ports; and
   communication means for establishing a dynamically selected communication link from a first of said plurality of communication nodes to a remote one of said plurality of communication nodes through the plurality of communication ports in response to respective requests by said plurality of communication nodes to transfer data through the established communication link,
   each of said plurality of communication nodes comprising a first communication link establishment request means for requesting said communication means to establish a first communication link through a first communication port which the remote communication counterpart node uses to accept establishment of a communication link;
   a second communication link accepting means for accepting establishment of a second communication link through a second communication port by said communication means in response to the request from said remote node, and
   link determination means for determining which of said first or said second communication link is first established;
   data transfer means for transferring data to and from said remote communication node through said first or said second communication link based on a determination of which link is established earlier,
   each of said communication nodes repeating establishment of said first communication link to said remote node, while waiting establishment of said second communication link from said remote communication node and transferring data through either one of said first and said second communication link.

2. The data transfer system as claimed in claim 1 wherein said communication link establishment request means further comprises clock means to determine if said request to establish said first communication link is granted within a preset time and to signal for repeating of the request after the preset time.

3. A data transfer method in which a communication link is dynamically selected and established to and from at least two of a plurality of communication nodes through a plurality of communication ports for transferring data through said established communication link, comprising the steps of:
   each of said communication nodes first requesting first communication link through a first communication port;
   each of said communication nodes awaiting establishment of a second communication link through a second communication port from a remote one of said plurality of communication nodes;
   repeating request for establishment of a first communication link through a first communication port which said remote communication node uses for accepting an establishment of a communication link;

determining which one of said first or said second communication link which is established earlier; and transferring data through the one of said first and said second communication links which is established earlier.

4. The data transfer method as claimed in claim 3 further comprising monitoring the time from said first requesting and wherein said repeating request is conducted after a predetermined length of time.

5. In a computer readable recording medium which records therein a program for having a computer execute in each of a plurality of communication nodes which are connected to communication means for establishing a communication link to other communication nodes through a plurality of communication ports in response to respective requests from said plurality of communication nodes to transfer data through the established communication link, a method for data transfer comprising the steps of:

a first step of requesting said communication means to establish a first communication link through a first communication port which the communication counterpart node uses to accept an establishment of a communication link, a second step of accepting an establishment of a second communication link through a second communication port by said communication means in response to the request from said remote node;

a third step of repeating said first step at a predetermined time interval until said first or said second communication link has been established; and a fourth step of determining which one of said first and said second communication links is established first and transferring data through the one of said first and said second communication links which is established first.

* * * * *